United States Patent
Matuonto et al.

(10) Patent No.: US 11,870,243 B2
(45) Date of Patent: Jan. 9, 2024

(54) METHOD OF CONTROLLING A RENEWABLE POWER GENERATION PLANT

(71) Applicant: Siemens Gamesa Renewable Energy A/S, Brande (DK)

(72) Inventors: Marco Matuonto, Vizcaya (ES); Santiago Lentijo, Winter Park, FL (US); Rajat Majumder, Oviedo, FL (US); Didier Velez Castellano, Oviedo, FL (US)

(73) Assignee: SIEMENS GAMESA RENEWABLE ENERGY A/S

( * ) Notice: Subject to any disclaimer, the term of this patent is extended or adjusted under 35 U.S.C. 154(b) by 410 days.

(21) Appl. No.: 17/274,471

(22) PCT Filed: Aug. 12, 2019

(86) PCT No.: PCT/EP2019/071539
§ 371 (c)(1),
(2) Date: Mar. 9, 2021

(87) PCT Pub. No.: WO2020/057860
PCT Pub. Date: Mar. 26, 2020

(65) Prior Publication Data
US 2022/0052518 A1 Feb. 17, 2022

Related U.S. Application Data (60) Provisional application No. 62/733,791, filed on Sep. 20, 2018.

(51) Int. Cl.
*H02H 7/26* (2006.01)
*H02J 13/00* (2006.01)
*H02J 3/38* (2006.01)

(52) U.S. Cl.
CPC ............. *H02H 7/263* (2013.01); *H02J 3/381* (2013.01); *H02J 13/00006* (2020.01); *H02J 13/00034* (2020.01); *H02J 2300/20* (2020.01)

(58) Field of Classification Search
CPC ................................. H02H 7/263; H02J 3/381
See application file for complete search history.

(56) References Cited

U.S. PATENT DOCUMENTS

2011/0175620 A1 7/2011 Letas
2013/0138257 A1 5/2013 Edenfeld
(Continued)

FOREIGN PATENT DOCUMENTS

CN 102177634 A 9/2011
CN 105 375 532 A 3/2016
(Continued)

OTHER PUBLICATIONS

International Search Report and Written Opinion for PCT/EP2019/071539 dated Nov. 25, 2019.
(Continued)

*Primary Examiner* — Mark A Connolly
(74) *Attorney, Agent, or Firm* — Schmeiser, Olsen & Watts LLP (57) ABSTRACT

Provided is a renewable power generation plant, a computer program product and method of controlling a renewable power generation plant including a power converter for connecting the renewable power generation plant to a power transmission network; a circuit breaker arrangement between the power converter and the power transmission network including a circuit breaker for each phase of the renewable power generation plant; and a converter controller configured to generate control signals for the power converter and control signals for the circuit breaker arrangement; which method includes the steps of detecting the occurrence of a phase-to-ground fault event in one of the phases of the power transmission network; issuing control signals to the circuit breaker arrangement to keep the circuit breakers closed during the phase-to-ground event; and issuing control signals to the power converter to ride through the phase-to-ground fault event.

15 Claims, 5 Drawing Sheets

(56) References Cited

U.S. PATENT DOCUMENTS

2016/0109493 A1   4/2016  Cheng
2016/0139643 A1   5/2016  Hasler
2020/0395757 A1*  12/2020 Mukhedkar ............ H02H 3/021

FOREIGN PATENT DOCUMENTS

| CN | 108258713 A |   | 7/2018 |
|----|-------------|---|--------|
| JP | 2000331575 A | * | 11/2000 |
| RU | 2383983 C1 |   | 3/2010 |
| WO | 2012/062323 A2 |   | 5/2012 |

OTHER PUBLICATIONS

Kim, Hyun-Sung et al.; "Numerical analysis of the dynamics of inter-linked SPAR structures using connectors for possible wind farm application"; published: Feb. 11, 2016.

Li, Bin et al.; "The impact of wind farm access on the reclosure of high-voltage outgoing transmission lines"; vol. 27; No. 12; published: Dec. 31, 2015.

* cited by examiner

METHOD OF CONTROLLING A RENEWABLE POWER GENERATION PLANT

CROSS-REFERENCE TO RELATED APPLICATIONS

This application claims priority to PCT Application No. PCT/EP2019/071539, having a filing date of Aug. 12, 2019, which claims priority to and the benefit of U.S. Provisional Application No. 62/733,791, filed Sep. 20, 2018, and entitled, "SINGLE POLE AUTO RECLOSE FUNCTION FOR RENEWABLE POWER GENERATION", the entire contents both of which are hereby incorporated by reference.

FIELD OF TECHNOLOGY

The following describes a method of controlling a renewable power generation plant and a renewable power generation plant.

BACKGROUND

According to statistics, many faults that arise in power transmission networks are temporary faults which disappear a certain time after de-energization of the faulted sections of the network. A fault may be caused, for example, by vegetation coming in contact with the power line and then burning off after a brief period of time. This type of fault in a single phase of a multi-phase power transmission network is commonly referred to as a line-to-ground fault or a phase-to-ground fault.

To respond to such faults, the power transmission network has a fault response system, for example comprising a control relay and a circuit breaker unit between the power transmission network and each power generation plant. The control relay monitors phase voltages and currents. If a fault is deemed to have occurred, the control relay issues control signals to the circuit breaker unit to open the circuit breaker(s) of one or more phases depending on the nature of the fault. For example, in the case of a single-pole fault on one of the phases, the control relay will issue control signals to the circuit breaker unit to open the circuit breaker of that phase. The control relay can re-close the circuit breaker after a predetermined dead-time during which the cause of the fault may have been removed. The sequence of fault occurrence and subsequent restoration is referred to as a fault event. A single-pole fault followed by opening of the circuit breaker and subsequent re-closure of the circuit breaker after the predetermined dead-time is a phase-to-ground fault event and is referred to as single-pole auto-reclose (SPAR) when performed by the control relay of the power transmission network. Manual intervention is not required.

In existing renewable power generation plants such as wind turbines, a single-pole phase-to-ground fault in the power transmission network may cause poles of a power converter to trip, i.e. pole breakers between the renewable power generation plant and the transmission network are opened to disconnect the power generation plant from the grid. This is because a SPAR event is followed by instability with transient overvoltages, and existing control techniques for renewable power generation plants can only tolerate instability or unbalanced operation for a few cycles (~100 ms). For this reason, a controller of a power converter of a renewable power generation plant is generally configured to trip its pole breakers (between the power generation plant and the transmission network) in response to a signal anomaly as a safeguard to protect the machine-side circuitry from potentially damaging over-voltages. In a three-phase power system of a renewable power plant such as a wind turbine, all pole breakers of the power converter are opened in response to a phase-to-ground fault in the power transmission network. This means that all three phases will be cut off from the transmission network even if the fault was only a single-pole phase-to-ground fault. Once the fault in the power transmission network has been eliminated, the pole breakers of the power converter can be closed again.

However, the plant cannot sell power as long as it is disconnected from the transmission line. Furthermore, before reclosing the opened pole breakers, it is necessary to synchronize the plant phases to the network phases. It can take several hours to re-start a renewable power generation plant that was tripped and shut down in response to a fault in the transmission network. The established way of responding to a single phase-to-ground fault can therefore have a detrimental impact on Annual Energy Production (AEP) for renewable power generation plants.

SUMMARY

An aspect relates to an improved way of responding to a single-pole phase-to-ground fault in a renewable power generation plant.

In the context of the embodiments of the invention, a renewable power generation plant comprises a power converter for connecting the renewable power generation plant to a power transmission network; a circuit breaker arrangement between the power converter and the power transmission network, comprising a circuit breaker for each phase of the renewable power generation plant; and a converter controller configured to generate control signals for the power converter and control signals for the circuit breaker arrangement.

According to the embodiments of invention, the method of controlling such a renewable power generation plant comprises the steps of detecting the occurrence of a phase-to-ground fault event in one of the phases of the power transmission network; issuing control signals to the circuit breaker arrangement to keep the circuit breakers closed during the phase-to-ground event; and issuing control signals to the power converter to ride through the phase-to-ground fault event.

As described above, a single-pole phase-to-ground fault is to be understood as the type of fault that arises when a single phase (the "faulty phase" or "affected phase") of the power transmission network is short-circuited for a period of time. This is in contrast to other types of fault, for example a high-voltage fault or a low-voltage fault. Existing controllers of renewable power plants such as wind turbines can ride through such transient high-voltage faults and low-voltage fault by executing a suitable fault ride-through routine.

An advantage of the inventive method is that there is no downtime for the renewable power generation plant as a result of a SPAR event in the transmission network. This means that there is essentially no loss of revenue arising from a SPAR event.

Another advantage of the inventive method is that there is no need to carry out a synchronization check before reclosing the opened pole breaker. This is because both ends of the line have been kept synchronized by the two healthy phases (the "unaffected phases").

An advantage of the inventive method is that any existing renewable power generation plant can be upgraded to include the SPAR response functionality without having to install any additional hardware. The SPAR response functionality can be included by updating the control software that runs on a power converter controller, a plant controller platform, etc.

The inventive method permits the plant to ride through the event as will be explained below so that the renewable power generation plant continues to be connected to the grid. With the inventive method, the renewable plant can remain online and ready to resume full power output after auto-reclosing of the affected pole.

According to the embodiments of the invention, the renewable power generation plant comprises a power converter for connecting the renewable power generation plant to a power transmission network; a circuit breaker arrangement between the power converter and the power transmission network, comprising a circuit breaker for each phase of the renewable power generation plant; and a converter controller configured to generate control signals for the power converter and control signals for the circuit breaker arrangement; and is characterized in that the converter controller further comprises a fault detection module configured to detect the occurrence of a phase-to-ground fault event in a single phase of the power transmission network, and wherein the converter controller is configured to issue control signals to the circuit breaker arrangement to keep the circuit breakers closed during the phase-to-ground event, and to issue control signals to the power converter to ride through the phase-to-ground fault event.

The fault detection module of the renewable power generation plant is configured to keep the affected pole breaker closed for the duration of the fault event or SPAR event. An advantage of the converter controller of the inventive renewable power generation plant is that it keeps the renewable power generation plant connected to the transmission network throughout the SPAR event.

Particularly advantageous embodiments and features of the embodiments of the invention are given by the dependent claims, as revealed in the following description. Features of different claim categories may be combined as appropriate to give further embodiments not described herein.

A renewable power generation plant such as a wind turbine, a solar park, etc. generally comprises a static converter at the interface to the grid. In the inventive method, the system control provides a strategy to prevent the converter from tripping, while still allowing the power generation plant to feed some active power into the grid. The control strategy applied in the inventive method may be robust enough to work reliably in a wide range of network setups, for example over a broad range of short circuit ratio (SCR) values and different network configurations such as meshed, radial, etc.

In the following, without restricting the embodiments of the invention in any way, it may be assumed that the renewable power generation plant or facility is a wind turbine configured to generate three-phase power. In an exemplary configuration, the wind turbine comprises a full power converter. The wind turbine can have a very large aerodynamic rotor, for example with a diameter in excess of 100 m. The rated power of such a wind turbine can be in the megawatt range. It may be assumed in the following that the "low-voltage" wind turbine is connected to a high-voltage power grid by a substation, as will be known to the skilled person. The terms "power transmission network" and "grid" are synonyms and may be used interchangeably.

The power converter of a wind turbine generally comprises a machine-side converter and a grid-side converter connected by a DC link. The power converter of a photovoltaic plant generally comprises only a grid-side converter. These are realized using power electronic switches, e.g., IGBTs (insulated-gate bipolar transistors) or IGCTs (integrated gate-commutated thyristors). During normal operation, these are switched by phase-width modulation signals issued by the converter controller. Timing is managed by a phase-locked loop that keeps the machine-side signals in sync with the grid-side signals.

Similarly, the pole-breakers or circuit-breakers of the renewable power generation plant can be realized using such power electronic switch arrangements.

A wind turbine controller generally implements a fault monitoring algorithm that examines the relevant voltages and currents to determine whether or not all is functioning correctly. If a machine-side fault or grid-side fault occurs, the voltages and/or currents will exhibit abnormal behavior. It is known to apply the method of symmetrical components to simplify the analysis of a three-phase power system, for example converting the three-phase voltage signals into a positive sequence voltage, a negative sequence voltage and a zero sequence voltage. The method of symmetrical components can greatly simplify the identification of abnormal behavior, i.e., to identify the type of fault and to choose an appropriate response. For example, if a grid overvoltage is detected, the controller can initiate a high-voltage ride through (HVRT) sequence. Similarly, if a grid undervoltage is detected, the controller can initiate a low-voltage ride through (LVRT) sequence.

Similarly, in an embodiment of the invention, the occurrence of a SPAR event is deduced from analysis of the positive sequence voltages and negative sequence voltages. In an embodiment, detection of the SPAR event in the power transmission network is assigned a lower priority than the detection of a more serious fault such as an overvoltage fault or an undervoltage fault.

When the occurrence of a SPAR event is detected by the controller, a first measure is to "freeze" the phase-locked loop (PLL) of the power converter control, since the unaffected phases will stay connected to the grid and will therefore remain synchronized. In an embodiment, the converter controller is configured to adjust the gate switching signals of the power electronic switches of the unaffected phases during the fault event, so that the renewable power generation system stays connected to the grid during and following a SPAR event, and is quickly able to resume normal operation once the affected phase of the transmission network is restored, since the PLL of the power converter remains synchronized with the grid. Alternatively, the converter controller could be configured to suppress the gate switching signals of the power electronic switches of the grid-side converter.

In a particular embodiment of the invention, the converter controller is configured to inject negative sequence current into an "unaffected" phase of the renewable power generation plant during the SPAR event. Alternatively, the converter controller could be configured to suppress the gate switching signals of the power electronic switches of the grid-side converter. The effect of the injected negative sequence current is to counteract the transient overvoltages (TOVs) that appear when the pole breaker is opened for the faulty phase of the transmission network. In an embodiment, the magnitude of the injected current is determined on the basis of a negative sequence voltage observed at the machine-side, e.g., as observed by a wind turbine generator at its machine-side power converter terminals. In the inventive method, the per-unit magnitude of the injected negative sequence current is at least 0.4. In the inventive method, the control algorithm takes into consideration the voltage and current imbalances, as well as the contributions of the positive and negative sequence voltages. In this way, the algorithm can differentiate between a SPAR event and any other type of grid transient.

An exemplary SPAR sequence of events may be as follows: a single line-to-ground fault occurs, for example as a result of vegetation falling onto a phase of an overhead transmission line. Such a fault may persist for several cycles. The pole breaker corresponding to the faulty phase is opened by a control relay of the transmission line. At some point following the phase-to-ground fault, the control relay of the transmission line determines is able to reclose the pole-breaker. Pole opening and re-closing results in an unbalanced mode of operation at the renewable power plant. The unbalanced mode may persist for several cycles, for example up to 30 cycles. By analysis of the grid-side voltage and current signals, the fault detection module can deduce that a SPAR event has taken place and initiates a SPAR fault-ride-through sequence. A first response is to ensure that all pole breakers of the renewable power generation plant remain closed, including the pole breaker of the faulty phase. The transient overvoltages (TOVs) arising from the SPAR event are dealt with by injecting negative sequence current to counteract the negative sequence voltage seen by the generator at its own terminal, in order to prevent damage to the power electronics. Ultimately, by analysis of the grid-side voltage/current signals, the fault detection module can deduce that the SPAR event has passed and that the affected phase of the transmission line is fully operational again. The SPAR fault-ride-through sequence can terminate, and normal operation resumes. The power converter can then resume feeding reactive and active current into the grid. There is no need to perform any re-synchronization routine, since the two unaffected phases have remained in sync, and the PLL is already correctly configured.

As indicated above, the inventive method can deal with TOVs in the unaffected phases by injecting negative sequence current to counteract a grid-side negative sequence voltage seen by the power generation plant at its own terminal.

In an embodiment of the invention, the converter controller is configured to control the power converter to deliver active and reactive power during a phase-to-ground fault. In an embodiment, the delivery of reactive power is given priority over active power during a phase-to-ground fault.

In a particular embodiment of the invention, the production of reactive current is initially given priority to facilitate full recovery. When the terminal voltage of the renewable power generation facility is within an acceptable range, the renewable power generation facility will then give priority to the production of active power.

The fault-detection algorithm of a controller continually analyses voltages and currents. The inventive method also comprises a step of determining the restoration of the affected phase in the power transmission network. The affected phase is restored upon clearance or elimination of the fault. This can be deduced from analysis of the positive sequence voltages and negative sequence voltages.

The inventive fault response method is robust enough to work reliably in a wide range of network setups, e.g., for a broad range of short-circuit ratio (SCR) values and various type of network configuration such as meshed, radial etc. For example, a low SCR in the region of 3.0 will result in high TOV, which can be counteracted as described above by the injection of negative sequence current. In a particular embodiment of the invention, converter control and protection parameters may be adapted accordingly. For example, one or more parameters such as a gain value, a time constant, a notch filter cut-off frequency, etc. may be adjusted as appropriate. In this way, the inventive method can assist in responding to a SPAR event even in a challenging grid.

The inventive method can be carried out at least partially as an algorithm or computer program. A computer program product (non-transitory computer readable storage medium having instructions, which when executed by a processor, perform actions) according to the embodiments of the invention can comprise a computer program that is directly loadable into a memory of a controller of a renewable power generation plant and which comprises program elements for performing steps of the inventive method when the computer program is executed by the controller.

BRIEF DESCRIPTION

Some of the embodiments will be described in detail, with references to the following Figures, wherein like designations denote like members, wherein.

DETAILED DESCRIPTION

Figure 1:
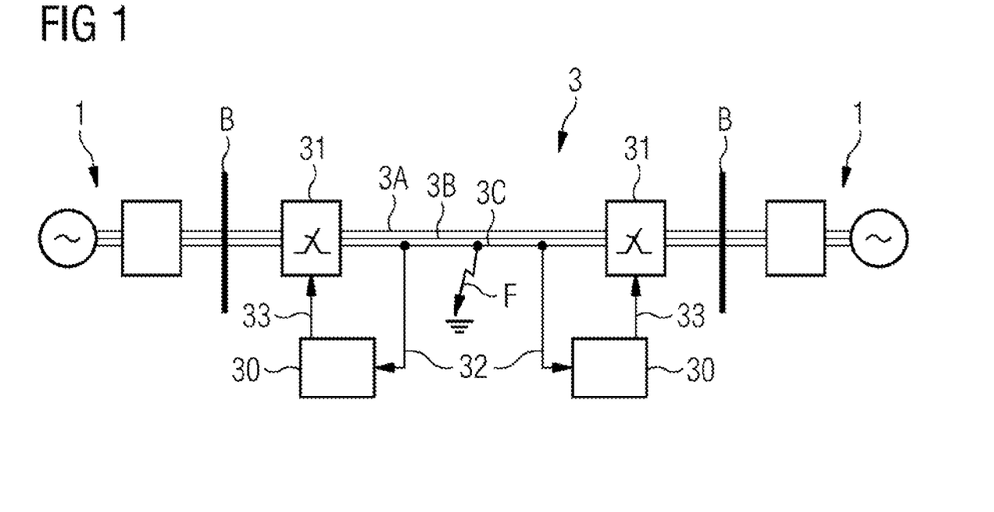
FIG. 1 shows a simplified block diagram of a power transmission network fed by two renewable power generation plants.

FIG. 1 shows a very simplified block diagram of a power transmission network 3 fed by two renewable power generation plants 1. Of course, the power transmission network 3 can be fed by any number of power generation plants including such renewable power generation plants 1. For example, each power generation plant 1 may be a wind turbine of a wind park, and all wind turbines of a wind park feed into the power transmission network 3 through a bus B.

The power transmission network 3 is a three-phase network, for example a 20 kV network, and power may be assumed to be transported in overhead power cables suspended from masts, with a separate cable for each phase 3A, 3B, 3C. Occasionally, a single phase-to-ground fault F may occur, for example if a branch of a tree makes contact with a power cable, in this case the power cable carrying phase 3C. This fault F will short the affected phase to ground.

To respond to faults, the power transmission network 3 has a fault response system, shown here to comprise a control relay 30 and a circuit breaker unit 31 between the power transmission network 3 and each bus B. The control relay 30 is configured to monitor phase measurements 32 (voltage and current) and to issue control signals 33 to the circuit breaker unit 31 to open the circuit breaker(s) of one or more phases 3A, 3B, 3C, depending on the nature of the fault. For example, in the case of a single-pole fault F on phase 3C, the control relay 30 will issue control signals 33 to the circuit breaker unit 31 to open the circuit breaker of phase 3C. The control relay 30 continues to monitor the phase voltages and currents in order to determine when the affected phase 3C has been restored. Once that phase 3C is deemed to be healthy again, the control relay 30 issues control signals 33 to the circuit breaker unit 31 to re-close the circuit breaker of phase 3C. The sequence of fault occurrence, pole-breaker opening, dead-time interval and pole-breaker re-closing is referred to as a "fault event". A single-pole fault followed by opening of the circuit breaker and subsequent re-closure of the circuit breaker is referred to as single-pole auto-reclose (SPAR) when performed by the control relay 30 of the power transmission network 3. Manual intervention is not required.

A renewable power plant such as a wind turbine or photovoltaic plant must comply with the applicable grid code. A grid code is a set of requirements that defines how an energy generation facility must be connected to the transmission network 3 to ensure safe, secure and proper operation. Up until now, response to a single phase-to-ground fault F has not been incorporated as part of any grid code for a renewable power plant. This is because, historically, this type of fault does not present a problem to a conventional power generation plant such as a nuclear power plant, a fossil-fuel power station etc., or any large synchronous generator that can ride through a fault and subsequent pole reclose events. A renewable power plant such as wind turbine can handle unbalanced operation for only a brief time, for example a few cycles (about 100 ms), so that the established response to a SPAR event has simply been to shut down and re-start when the affected phase has been restored. However, it takes considerable time to restart a renewable power generation plant, and the accumulated downtime from several such SPAR events can significantly reduce the annual output power (AEP).

Figure 2:
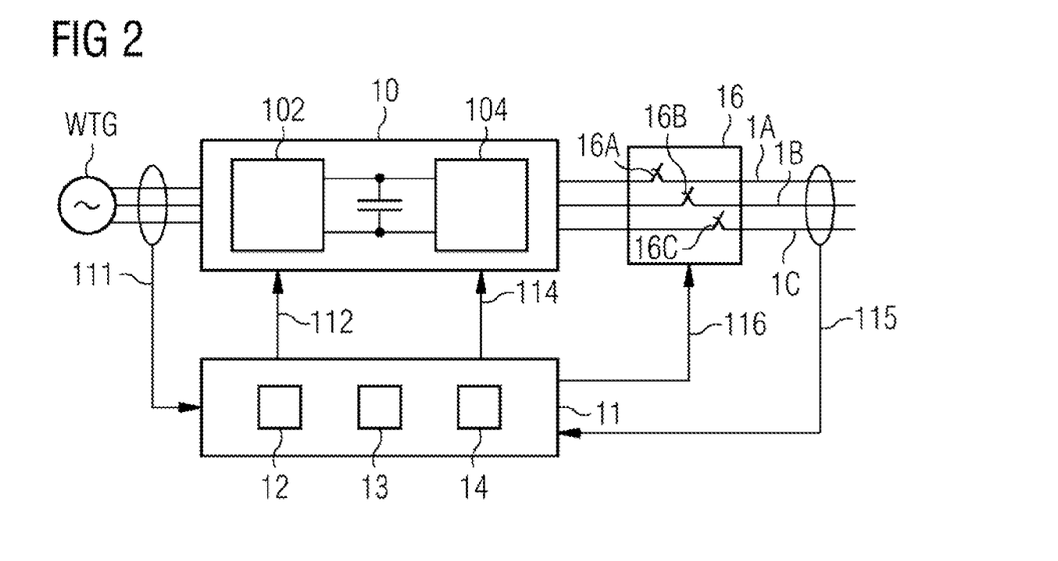
FIG. 2 shows embodiments of a renewable power generation plant according to embodiments of the invention.

FIG. 2 shows a first embodiment of a renewable power generation plant 1 according to the invention. Here, the renewable power generation plant 1 comprises a wind turbine generator WTG of the full-converter type. The wind turbine generator WTG generates three-phase power that is up-converted in a pulse-width modulated (PWM) power converter 10.

The renewable power generation plant 1 is configured to feed power into a high-voltage transmission network 3. The power converter 10 converts the low-voltage (e.g. 690 V) three-phase power generated by the wind turbine 1 into a higher voltage level. Generally, the power generation and transmission system use two step-up transformers, for example a power generation unit transformer to step-up from a low voltage (e.g. 690 V) to a mid-voltage (e.g. 20 kV) and a substation transformer to step-up from the mid-voltage to the grid voltage (e.g. 220 kV).

The renewable power generation plant 1 further comprises a converter controller 11 that monitors machine-side voltage/current measurements 111 as well as network-side voltage/current measurements 115. The network-side measurements 115 will be affected by any disturbance in the power transmission network 3.

The power converter 10 comprises a machine-side converter 102 and a grid-side converter 104. The converter controller 11 receives the machine-side measurements 111 and the network-side measurements 115. On the basis of this information, the converter controller 11 is configured to issue appropriate switching pulses 112 to the machine-side converter 102 and switching pulses 114 to the grid-side converter 104. The switching pulses 112, 114 may be assumed to comprise a set of PWM gate signals to the power electronics switches of the power converter. During normal operation, the machine-side voltages are up-converted for the grid-side phases 1A, 1B, 1C that can be fed via the bus into the transmission network 3.

To respond to a high-voltage fault or a low-voltage fault in the grid, the converter controller 11 comprises a fault detection module 12 and a fault ride-through module 13.

A circuit breaker unit 16 is arranged between the power converter 10 and the power transmission network 3, and comprises a circuit breaker 16A, 16B, 16C for each grid-side phase 1A, 1B, 1C of the renewable power generation plant 1.

The following discussion relates to the detection of a SPAR event in the power transmission network 3, i.e. a single-pole phase-to-ground fault as described in FIG. 1, followed by a subsequent auto reclose of the circuit breaker of the affected phase, whereby SPAR is effected by the relevant control relay 30 and circuit breaker unit 31. From the occurrence of the fault F to the restoration of the affected phase in the power transmission network 3, voltage imbalances are seen in the "unaffected" grid-side phases of the renewable power generation plant 1.

In this exemplary embodiment of the invention, the converter controller 11 also comprises a SPAR ride-through module 14. Using the network-side measurements 115, the converter controller 11 can detect the occurrence of a SPAR event in the power transmission network 3. The SPAR ride-through module 14 of the converter controller 11 responds by issuing control signals 116 to the circuit breaker unit 16 to keep closed the circuit breaker 16A, 16B, 16C for the affected grid-side phase, i.e. phase 1C using the example phase-to-ground fault in phase 3C of the transmission network 3 described in FIG. 1 above. The result of keeping phase 1C connected to the affected grid-side phase 3C means that the voltage imbalances (TOVs) following the SPAR event would also be "seen" by the power converter 10.

To deal with this, the SPAR ride-through module 14 in the converter controller 11 of the inventive renewable power generation plant 1 is configured to adjust the switching pulses 112, 114 of the power converter 10 to minimize the voltage imbalances, i.e. to ride-through the SPAR event.

In this way, the renewable power generation plant 1 remains connected to the transmission network 3 throughout the entire SPAR event. Because the phases 1A, 1B remain connected to the corresponding unaffected grid phases 3A, 3B, there is no need to carry out any re-synchronization sequence after the faulty phase is restored, and the affected phase 1C can immediately resume feeding into grid-side phase 3C.

The fault detection module 12, the fault ride-through module 13 and the SPAR ride-through module 14 can be implemented as software modules running on a processor of a plant controller, for example a wind turbine controller if the renewable power generation plant 1 is a wind turbine.

Figure 3:
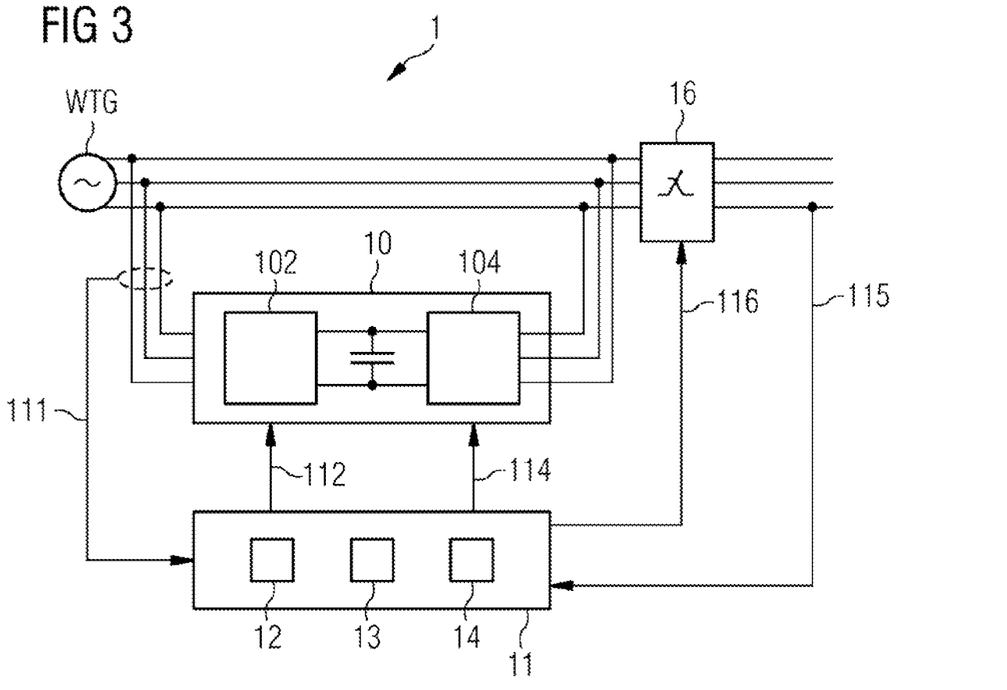
FIG. 3 shows embodiments of a renewable power generation plant according to embodiments of the invention.

FIG. 3 shows a second embodiment of a renewable power generation plant 1 according to the invention. Here, the renewable power generation plant 1 comprises a wind turbine generator WTG of the doubly-fed type. The principle of operation of the converter controller 11 is the same as in FIG. 2 above, and the converter controller 11 will issue appropriate switching control signals to the power electronics switches of the machine-side converter 102 and the grid-side converter 104.

Figure 4:
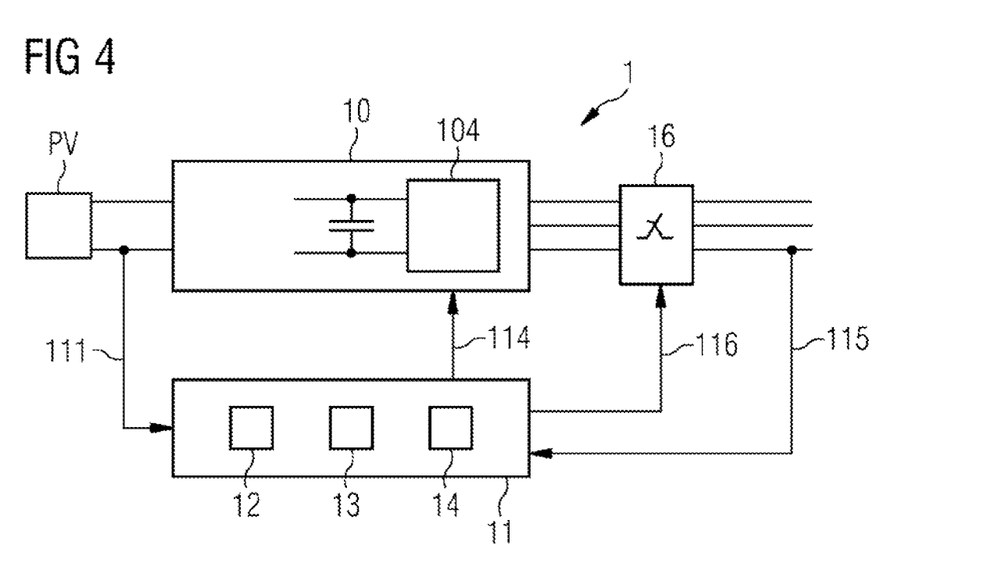
FIG. 4 shows embodiments of a renewable power generation plant according to embodiments of the invention.

FIG. 4 shows a third embodiment of a renewable power generation plant 1 according to the invention. Here, the renewable power generation plant 1 comprises a photovoltaic plant PV that generates a DC voltage. In this case, the power converter comprises only a grid-side converter 104, and the converter controller 11 will issue appropriate switching control signals to the power electronics switches of the grid-side converter 104.

Figure 5:
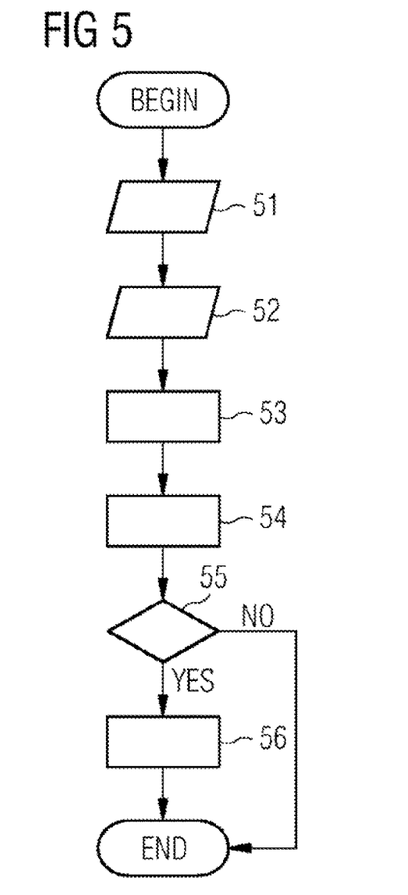
FIG. 5 is a flow chart to illustrate steps of the inventive method.

FIG. 5 shows a simplified flow-chart to illustrate steps of the inventive method.

In a first step 51, the magnitudes and phase angles of the three-phase voltages are measured. In a subsequent step 52, the magnitudes and phase angles of the instantaneous currents are measured. With this information, the positive sequence, negative sequence and zero sequence values are computed in stage 53. Higher-priority faults are dealt with in various stages collectively referred to as block 54 here. Response to a fault may be referred to as fault ride-through (FRT). Common fault response routines are low-voltage ride-through (LVRT), over-voltage ride-through (OVRT), etc. After the higher-priority faults have been ruled out, the positive sequence, negative sequence and zero sequence values and analyzed in block 55 to detect the occurrence of a SPAR event.

The occurrence of a SPAR event can be identified by detecting characteristics in the voltages and currents following such a fault event. The detection logic may be based on knowledge of fault characteristics, for example it may be assumed that no other type of voltage fault would result in a per-unit negative sequence voltage above 0.5. Analysis of the relevant parameters can take into consideration the voltage and current unbalances that follow a SPAR event as well as the contribution of the positive and negative sequence voltages. This will allow the controller to differentiate a SPAR event from other types of grid transients. If SPAR event detection returns "no", the control sequence can terminate. If it returns "yes", SPAR fault-ride-through is initiated in block 56. As described above, SPAR response can comprise the steps of keeping all pole-breakers closed and adjusting the gate-switching signals of the power converter; reducing reactive power to a low level; "freezing" the PLL; deactivating a frequency alarm; and performing over-voltage parameter tune-up. In the case of a wind turbine, the reactive power is reduced to a low level, and efforts are made to maintain the voltage at the wind turbine terminals to within a specific range, for example ±10% of nominal voltage. In normal conditions, a power generation unit will operate within certain frequency limits and will be disconnected from the power network system when the frequency is outside of these limits. Since transient frequencies outside of these limits may appear during the SPAR event, the frequency alarm is deactivated immediately when a SPAR event is detected in order to avoid tripping of the converter. Similarly, a SPAR event includes a step of opening the faulty phase, which usually results in transient over-voltages. When a SPAR event is detected by the inventive method, any relevant over-voltage parameter is briefly adjusted to avoid any tripping of the converter.

Following a single-pole fault, sub-cycle TOVs will be present. Once a sub-cycle TOV has passed, the converter controller assesses its capability of delivering negative sequence currents with the aim of remaining connected to the grid. Then, based on the overall current capacity, the converter controller will determine the available positive sequence active current. In this way, the renewable power generation facility can continue delivering at least some quantity of active power during the SPAR event. The effect of a single phase-to-ground fault in the grid on revenue and AEP of the renewable power generation plant will therefore be kept to a favorable minimum. The inventive method therefore has the potential for increasing the performance of a renewable power generation plant, by maintaining operation and avoiding loss of revenue during SPAR events.

Figure 6:
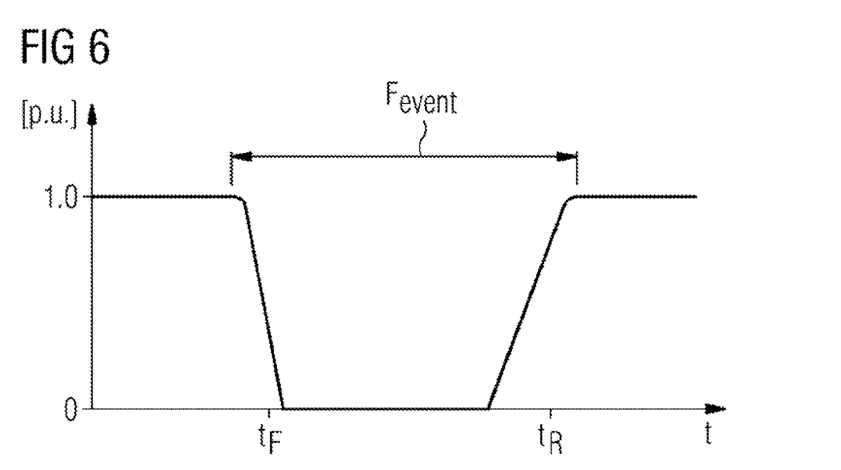
FIG. 6 illustrates aspects of the inventive method.
Figure 7:
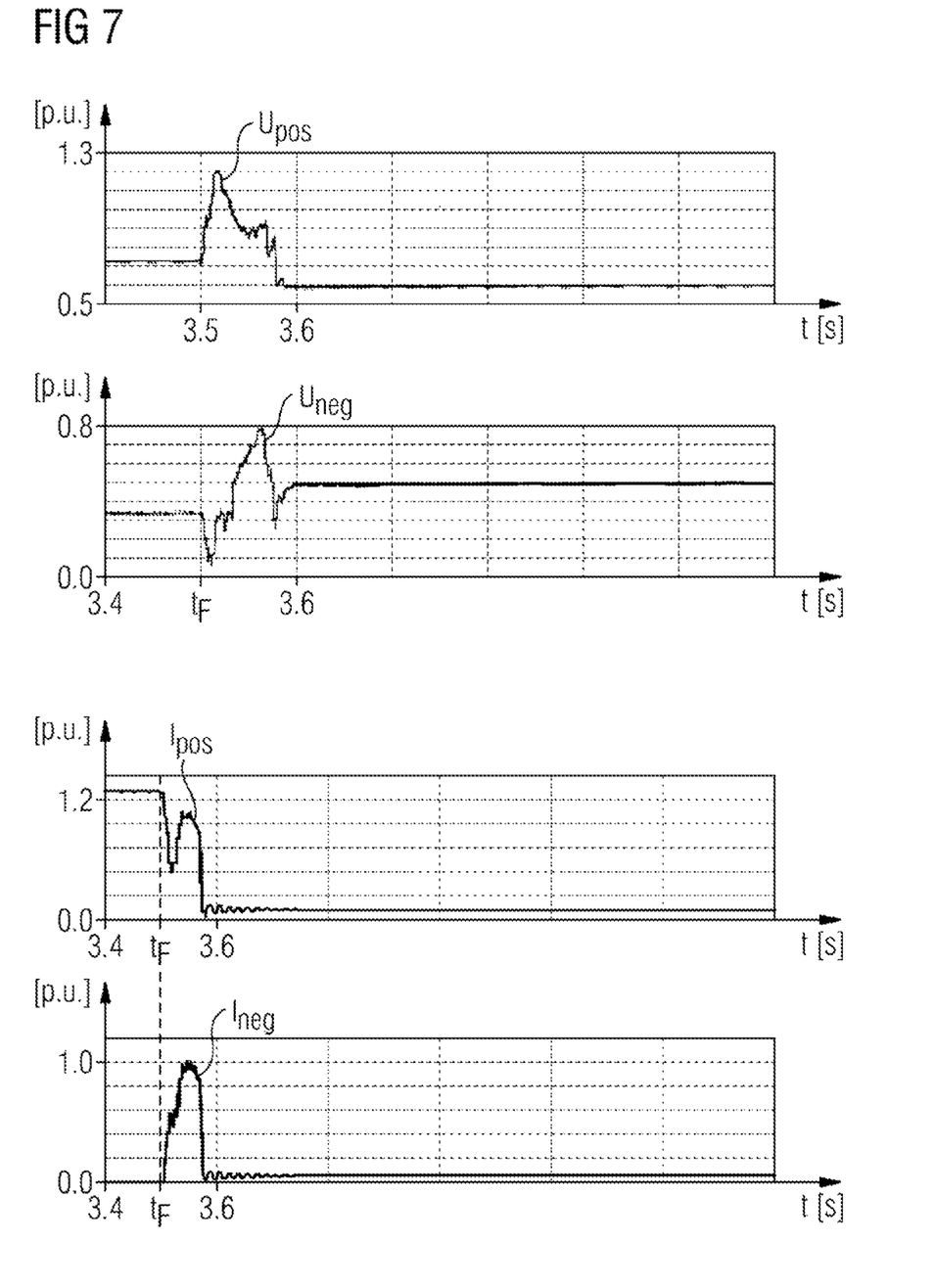
FIG. 7 illustrates aspects of the inventive method.
Figure 8:
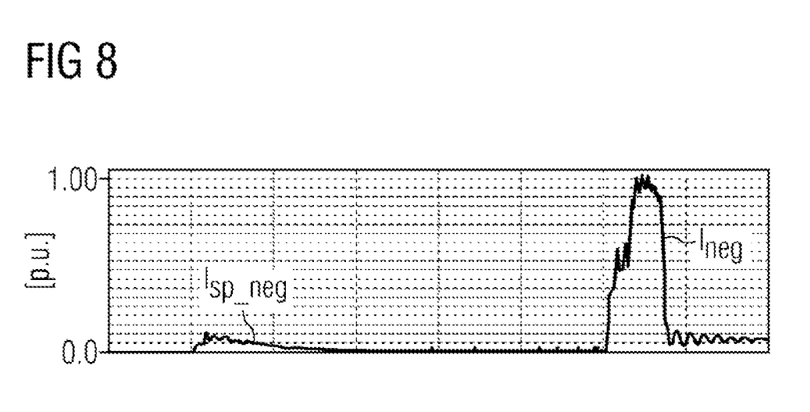
FIG. 8 illustrates aspects of the inventive method.

The sequence of events can be preceded by a step to enable/disable SPAR, for example to ensure that the SPAR response described here is only implemented in a power distribution network that includes a fault response system that identifies and responds to a phase-to-ground fault by carrying out a SPAR routine. FIGS. 6-8 illustrate aspects of the inventive method. FIG. 6 shows exemplary timing of a p.u. value of voltage/current for a phase of the transmission network prior to, during and after a SPAR event $F_{event}$. A phase-to-ground fault occurs in one phase of the transmission network at time $t_F$ and persists until time $t_R$ as indicated in FIG. 7. The duration of the phase-to-ground fault may be in the order of a few milliseconds, several seconds, or longer.

As a result of the fault, anomalies appear in the grid-side voltages/currents of the renewable power generation plant 1 as described above. The nature of the fault event is detected quickly (within a few cycles) by the fault detection module 13 and the converter controller 11 responds as described above, and normal operation is restored within a favorably short time. In normal operation (in the time prior to time $t_F$, and in the time following time $t_R$) the phasors of each set (positive sequence, negative sequence, zero sequence) are all the same size, and the positive sequence and negative sequence phasors are at 120° to each other.

FIG. 7 shows an exemplary voltage sequence and current sequence following a SPAR event, with the fault at 3.5 s and grid-side pole re-closure shortly afterward. The diagram shows positive sequence voltage $U_{pos}$, negative sequence voltage $U_{neg}$, positive sequence current $I_{pos}$ and negative sequence current $I_{neg}$. In the inventive method, negative sequence and positive sequence voltage and current are monitored to identify a SPAR event, i.e. to differentiate between a SPAR event and any other type of fault. In this example, the SPAR logic commences at 3.5 s with the wind turbine still connected to the power network system.

The behavior of the system following the fault may be summarized as follows: positive sequence voltage increases; negative sequence voltage increases; a highly unbalanced voltage condition follows; a high negative sequence current is injected. Here, the negative sequence voltage in excess of 0.5 p.u. allows identification of a SPAR event, since no other voltage fault event would result in such a negative voltage magnitude. To ride through the SPAR event, the voltage limit alarm is increased for a short period of time. A high negative sequence current $I_{neg}$ is injected to assist in fault ride-through. The controller is configured to interpret the high negative sequence current $I_{neg}$ as a characteristic of the SPAR event. In stable operation of a network, negative current has a per-unit value of 0.0. A "high negative sequence current" may be understood to be a p.u. negative sequence current in excess of 0.4.

FIG. 8 shows two exemplary negative sequence current plots to illustrate the difference between negative sequence current response in a single-phase event without SPAR, and in a SPAR event. Following a single-phase event without SPAR, the negative current $I_{sp\_neg}$ is relatively low. In SPAR fault-ride through using the inventive method, the per-unit negative sequence current I. is considerable, in this example it exceeds the single-phase event negative current $I_{sp\_neg}$ by a factor of ten and reaches a p.u. value of 1.0 as shown in FIG. 7. The effect of the injected negative sequence current $I_{neg}$ is to counteract a transient overvoltage. In this example, the fault controller 11 detects passing of the SPAR event and initiates completion of the SPAR ride-through sequence so that the converter controller issues control signals to resume normal operation of the power converter.

Although the present invention has been disclosed in the form of preferred embodiments and variations thereon, it will be understood that numerous additional modifications and variations could be made thereto without departing from the scope of the invention. For example, during a SPAR event ride through, the converter can stop switching the power devices of the converter, so that neither active power nor reactive power is injected into the grid. However, the converter is on a stand-by state ready to resume operation as soon as the SPAR event passes. The method described herein is applicable to any renewable power plant that is connected to the grid via a converter, such as wind farms and photovoltaic parks.

For the sake of clarity, it is to be understood that the use of "a" or "an" throughout this application does not exclude a plurality, and "comprising" does not exclude other steps or elements.

The invention claimed is:

1. A method of controlling a renewable power generation plant comprising:
    a power converter for connecting the renewable power generation plant to a power transmission network;
    a circuit breaker arrangement between the power converter and the power transmission network, having a circuit breaker for each phase of the renewable power generation plant; and
    a converter controller configured to generate control signals for the power converter and control signals for the circuit breaker arrangement;
which method comprises the steps of
    detecting the occurrence of a phase-to-ground fault event in one of the phases of the power transmission network;
    issuing control signals to the circuit breaker arrangement to keep the circuit breakers closed during the phase-to-ground event; and
    issuing control signals to the power converter to ride through the phase-to-ground fault event.

2. The method according to claim 1, wherein the occurrence of a phase-to-ground fault event is deduced from analysis of grid-side voltage and current values.

3. The method according to claim 1, wherein the control signals issued to the power converter are generated to inject negative sequence current to counteract a grid-side transient overvoltage resulting from the phase-to-ground fault event.

4. The method according to claim 1, wherein the converter controller is configured to issue gate switching signals to deliver active power into the power transmission network during a phase-to-ground fault event.

5. The method according to claim 1, wherein the converter controller is configured to issue gate switching signals to deliver reactive power into the power transmission network during a phase-to-ground fault event.

6. The method according to claim 1, wherein delivery of reactive power is given priority over delivery of active power during a phase-to-ground fault event.

7. The method according to claim 1, wherein detection of a phase-to-ground fault event is assigned a lower priority than the detection of an over-voltage fault.

8. The method according to claim 1, wherein detection of a phase-to-ground fault event is assigned a lower priority than the detection of a low-voltage fault.

9. A renewable power generation plant comprising;
    a power converter for connecting the renewable power generation plant to a power transmission network;
    a circuit breaker arrangement between the power converter and the power transmission network, comprising a circuit breaker for each phase of the renewable power generation plant; and
    a converter controller configured to generate control signals for the power converter and control signals for the circuit breaker arrangement; wherein
the converter controller further comprises a fault detection module configured to detect the occurrence of a phase-to-ground fault event in a single phase of the power transmission network, and wherein the converter controller is configured to issue control signals to the circuit breaker arrangement to keep the circuit breakers closed during the phase-to-ground event, and to issue control signals to the power converter to ride through the phase-to-ground fault event.

10. The renewable power generation plant according to claim 9, wherein the fault detection module is configured to distinguish a phase-to-ground fault event from a high-voltage fault event and/or to distinguish a phase-to-ground event from a low-voltage fault event.

11. The renewable power generation plant according to claim 9, realized as a wind turbine generator.

12. The renewable power generation plant according to claim 9, wherein the power converter comprises a machine-side converter and a grid-side converter, each with a power semiconductor switch arrangement for each phase, and wherein the converter controller is configured to issue phase-width modulated gate switching signals for the machine-side converter and to issue phase-width modulated gate switching signals for the grid-side converter.

13. The renewable power generation plant according to claim 9, realized as photovoltaic generator.

14. The renewable power generation plant according to claim 9, wherein the power converter comprises a grid-side converter with a power semiconductor switch arrangement for each phase, and wherein the converter controller is configured to issue phase-width modulated gate switching signals for the grid-side converter.

15. A computer program product, comprising a computer readable hardware storage device having computer readable program code stored therein, said program code executable by a processor of a computer system to implement a method comprising a computer program that is directly loadable into a memory of a controller of a renewable power generation plant and which comprises program elements for performing steps of the method according to claim 1 when the computer program is executed by the controller.

* * * * *